(12) United States Patent
Kemp

(10) Patent No.: US 9,767,132 B2
(45) Date of Patent: *Sep. 19, 2017

(54) SYSTEMS AND METHODS FOR REAL-TIME DE-DUPLICATION

(71) Applicant: salesforce.com, inc., San Francisco, CA (US)

(72) Inventor: Christopher Kemp, Toronto (CA)

(73) Assignee: salesforce.com, inc., San Francisco, CA (US)

( * ) Notice: Subject to any disclaimer, the term of this patent is extended or adjusted under 35 U.S.C. 154(b) by 13 days.

This patent is subject to a terminal disclaimer.

(21) Appl. No.: 13/648,075

(22) Filed: Oct. 9, 2012

(65) Prior Publication Data

US 2013/0091104 A1 Apr. 11, 2013

Related U.S. Application Data

(60) Provisional application No. 61/545,259, filed on Oct. 10, 2011.

(51) Int. Cl.
*G06F 17/00* (2006.01)
*G06F 17/30* (2006.01)

(52) U.S. Cl.
CPC .. *G06F 17/30345* (2013.01); *G06F 17/30283* (2013.01)

(58) Field of Classification Search
CPC .......... G06F 17/30247; G06F 11/1458; G06F 11/1469; G06F 17/30; G06F 17/30333; G06F 19/321; G06F 19/322; G06F 21/10; G06F 2201/80; G06F 17/30283; G06F 17/30345
See application file for complete search history.

(56) References Cited

U.S. PATENT DOCUMENTS

| 5,577,188 A | 11/1996 | Zhu |
| 5,608,872 A | 3/1997 | Schwartz |
| 5,649,104 A | 7/1997 | Carleton |
| 5,715,450 A | 2/1998 | Ambrose et al. |

(Continued)

OTHER PUBLICATIONS

Saba, "Saba Announces Revolutionary Social Enterprise Platform," Press Release, Mar. 20, 2012, pp. 1-4, Redwood Shores, California.

*Primary Examiner* — Angelica Ruiz
(74) *Attorney, Agent, or Firm* — Dergosits & Noah LLP; Todd A. Noah

(57) ABSTRACT

Disclosed are systems, apparatus, and methods for identifying and visualizing duplicative records via a social network. In various implementations, a first data object may be created and stored in a first database system, where the first data object includes a plurality of data fields capable of storing a plurality of data values. In some implementations, a trigger function may be executed in response to creating the first data object, where the trigger function causes one or more servers in a second database system to determine if one or more existing data objects stored in the second database system include one or more data values that match data values included in the first data object. In various implementations, feed items may be generated in response to determining that a match exists, where the feed items provide one or more users with an indication of the determined match.

22 Claims, 10 Drawing Sheets

(56) References Cited

U.S. PATENT DOCUMENTS

| | | |
|---|---|---|
| 5,761,419 A | 6/1998 | Schwartz |
| 5,819,038 A | 10/1998 | Carleton |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff et al. |
| 6,216,135 B1 | 4/2001 | Brodersen et al. |
| 6,233,617 B1 | 5/2001 | Rothwein et al. |
| 6,236,978 B1 | 5/2001 | Tuzhilin et al. |
| 6,266,669 B1 | 7/2001 | Brodersen et al. |
| 6,288,717 B1 | 9/2001 | Dunkle et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer et al. |
| 6,418,436 B1* | 7/2002 | Degen ............... G06Q 20/24 |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier |
| 6,654,032 B1 | 11/2003 | Zhu |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1* | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 6,985,926 B1 | 1/2006 | Ferlauto |
| 7,062,502 B1 | 6/2006 | Kesler |
| 7,100,111 B2 | 8/2006 | McElfresh et al. |
| 7,191,192 B2 | 3/2007 | Yellepeddy et al. |
| 7,200,604 B2 | 4/2007 | Forman et al. |
| 7,269,590 B2 | 9/2007 | Hull et al. |
| 7,340,411 B2 | 3/2008 | Cook |
| 7,373,599 B2 | 5/2008 | McElfresh et al. |
| 7,401,094 B1 | 7/2008 | Kesler |
| 7,406,501 B2 | 7/2008 | Szeto et al. |
| 7,451,103 B1* | 11/2008 | Boyle ............... G06Q 20/10 705/35 |
| 7,454,509 B2 | 11/2008 | Boulter et al. |
| 7,564,994 B1* | 7/2009 | Steinberg ........... G06K 9/00288 340/5.53 |
| 7,599,935 B2 | 10/2009 | La Rotonda et al. |
| 7,603,331 B2 | 10/2009 | Tuzhilin et al. |
| 7,620,655 B2 | 11/2009 | Larsson |
| 7,644,122 B2 | 1/2010 | Weyer et al. |
| 7,668,861 B2 | 2/2010 | Steven |
| 7,698,160 B2 | 4/2010 | Beaven et al. |
| 7,747,648 B1 | 6/2010 | Kraft et al. |
| 7,765,127 B2* | 7/2010 | Banks ............... G06Q 30/06 235/378 |
| 7,818,659 B2* | 10/2010 | Kahn et al. ............... 715/203 |
| 7,827,208 B2 | 11/2010 | Bosworth et al. |
| 7,917,840 B2* | 3/2011 | Newman ............ G06F 17/30867 715/208 |
| 7,945,653 B2 | 5/2011 | Zuckerberg et al. |
| 8,005,896 B2 | 8/2011 | Cheah et al. |
| 8,010,663 B2 | 8/2011 | Firminger et al. |
| 8,082,301 B2 | 12/2011 | Ahlgren et al. |
| 8,095,413 B1 | 1/2012 | Beaven et al. |
| 8,095,594 B2 | 1/2012 | Beaven et al. |
| 8,103,611 B2 | 1/2012 | Tuzhilin et al. |
| 8,150,913 B2 | 4/2012 | Cheah et al. |
| 8,275,836 B2 | 9/2012 | Beaven et al. |
| 8,396,841 B1 | 3/2013 | Janakiraman |
| 8,650,159 B1 | 2/2014 | Zhang |
| 8,838,549 B2 | 9/2014 | Bodapati et al. |
| 2001/0029478 A1 | 10/2001 | Laster et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0097359 A1 | 5/2003 | Ruediger |
| 2003/0120675 A1 | 6/2003 | Stauber et al. |
| 2003/0126156 A1 | 7/2003 | Soltenberg et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2004/0001092 A1 | 1/2004 | Rothwein et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2005/0209903 A1 | 9/2005 | Hunter et al. |
| 2006/0075323 A1 | 4/2006 | Singh et al. |
| 2006/0101096 A1 | 5/2006 | Fuerst |
| 2006/0173985 A1* | 8/2006 | Moore ............... 709/223 |
| 2006/0235831 A1* | 10/2006 | Adinolfi ............... G06Q 40/00 |

(56) References Cited

U.S. PATENT DOCUMENTS

| | | | |
|---|---|---|---|
| 2006/0247944 A1* | 11/2006 | Calusinski, Jr. | G06Q 40/00 705/1.1 |
| 2008/0162510 A1* | 7/2008 | Baio et al. | 707/100 |
| 2008/0243790 A1* | 10/2008 | Garfinkle | G06F 17/30333 |
| 2008/0243967 A1* | 10/2008 | Bhatia | G06F 17/30489 |
| 2009/0063415 A1 | 3/2009 | Chatfield et al. | |
| 2009/0119581 A1 | 5/2009 | Belusamy | |
| 2010/0205541 A1* | 8/2010 | Rapaport | G06Q 10/10 715/753 |
| 2011/0004831 A1* | 1/2011 | Steinberg et al. | 715/753 |
| 2011/0179020 A1* | 7/2011 | Ozzie et al. | 707/723 |
| 2012/0072428 A1* | 3/2012 | Kao et al. | 707/748 |
| 2012/0158843 A1* | 6/2012 | Angani et al. | 709/204 |
| 2012/0191671 A1 | 7/2012 | Kitamura | |

\* cited by examiner

FIG. 7

SYSTEMS AND METHODS FOR REAL-TIME DE-DUPLICATION

CLAIM OF PRIORITY

This application claims the benefit of U.S. Provisional Patent Application 61/545,259 entitled SYSTEMS AND METHODS FOR REAL-TIME DE-DUPLICATION, by Christopher Kemp, filed Oct. 10, 2011, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

One or more implementations relate generally to computer systems and software, and, more particularly, to comparing data objects and providing information feed alerts.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Organizations and enterprises typically employ many different types of software and computing technologies to meet their computing needs. However, installing and maintaining software on an organization's own computer systems may involve one or more drawbacks. For example, when software must be installed on computer systems within the organization, the installation process often requires significant time commitments, since organization personnel may need to separately access each computer. Once installed, the maintenance of such software typically requires significant additional resources. Each installation of the software may need to be separately monitored, upgraded, and/or maintained. Further, organization personnel may need to protect each installed piece of software against viruses and other malevolent code. Given the difficulties in updating and maintaining software installed on many different computer systems, it is common for software to become outdated. Also, the organization will likely need to ensure that the various software programs installed on each computer system are compatible. Compatibility problems are compounded by frequent upgrading, which may result in different versions of the same software being used at different computer systems in the same organization.

Accordingly, organizations and enterprises increasingly prefer to use on-demand services accessible via the Internet rather than software installed on in-house computer systems. On-demand services, often termed "cloud computing" services, take advantage of increased network speeds and decreased network latency to provide shared resources, software, and information to computers and other devices upon request. Cloud computing typically involves over-the-Internet provision of dynamically scalable and often virtualized resources. Technological details can be abstracted from the users, who no longer have need for expertise in, or control over, the technology infrastructure "in the cloud" that supports them.

BRIEF SUMMARY

Disclosed are systems, apparatus, and methods for identifying and visualizing duplicative records via a social network. In some implementations, a method is provided in which a first data object may be created and stored in a first database system, where the first data object includes a plurality of data fields capable of storing a plurality of data values. In some implementations, a trigger function may be executed in response to creating the first data object, where the trigger function causes one or more servers in a second database system to determine if one or more existing data objects stored in the second database system include one or more data values that match data values included in the first data object. In some implementations, one or more feed items may be generated in response to determining that a match exists, where the one or more feed items provide one or more users with an indication of the determined match.

In some implementations, the one or more feed items include a first feed item generated for an owner of the first data object, where the first feed item is capable of notifying the owner that a match has been determined. In various implementations, the one or more feed items include a second feed item generated for an owner or owners of the one or more existing data objects, where the second feed item is capable of notifying the owner or owners that a match has been determined. In particular embodiments, the one or more feed items include one or more links to either the first data object or the one or more existing data objects, where a user may select the one or more links to access or modify one or more of the first data object and the one or more existing data objects. In various implementations, an association between the first data object and the one or more existing data objects may be created, where the association automatically applies a change from one data object to another.

In various implementations, the first data object may be a record stored in a multi-tenant data base system and may be capable of storing one or more data values contributed by a user of the multi-tenant database system. In some implementations, the record is a type of record selected from the group consisting of an account, contact, lead, and opportunity. In various implementations, the determining is based on one or more data values selected from the group consisting of a phone number, a name, an address, a company name, a professional organization name, an employee identifier, and an email address. In some implementations, the first data object and the one or more existing data objects are different types of records. In particular implementations, the retrieved one or more data values include information aggregated from a distributed group of users. In some implementations, the first database system and the second database system are operated by the same entity.

In various implementations, a machine-readable medium is provided that carries one or more sequences of instructions which, when executed by one or more processors, cause the one or more processors to create a first data object stored in a first database system, where the first data object includes a plurality of data fields capable of storing a plurality of data values. In some implementations, the machine-readable medium may further cause the one or more processors to execute a trigger function in response to creating the first data object, where the trigger function causes one or more servers in a second database system to determine if one or more existing data objects stored in the second database system include one or more data values that match data values included in the first data object. In various implementations, the machine-readable medium may further cause the one or more processors to generate one or more feed items in response to determining that a match exists, where the one or more feed items provide one or more users with an indication of the determined match.

In various implementations, an apparatus is provided that may include a processor and one or more stored sequences of instructions which, when executed by the processor, cause the processor to create a first data object stored in a first database system, where the first data object includes a plurality of data fields capable of storing a plurality of data values. In some implementations, the instructions may further cause the processor to execute a trigger function in response to creating the first data object, where the trigger function causes one or more servers in a second database system to determine if one or more existing data objects stored in the second database system include one or more data values that match data values included in the first data object. In some implementations, the instructions may further cause the processor to generate one or more feed items in response to determining that a match exists, where the one or more feed items provide one or more users with an indication of the determined match.

In various implementations, a user of an on-demand service or enterprise application may store and manage information in a database system operated by the on-demand service or enterprise application. In some implementations the information may be information related to the user's business, such as contact information that includes biographical and personal information about the user's business contacts. The information may also be related to other entities, such as potential sales leads, sales accounts, and companies. In various implementations, the user may store information locally, or in a first database system. However, additional information may often be available from other sources, such as data tracking services or data repositories. These other sources may store information in a cloud-based storage system which may utilize a second database system.

Conventional methods do not provide an efficient way of reconciling information that may be stored in the two different locations. For example, if a user wants to import information from a different source, such as a database system operated by a data tracking service such as Data.com® provided by salesforce.com, inc., the user must manually initiate a process to query the database. If any relevant records are found, the user may have to manually perform a field by field comparison to determine which information should be imported.

Various implementations of the present disclosure provide methods and systems by which information may be automatically identified and retrieved in real-time. For example, a trigger function may be executed in response to an action taken by the user, such as creating a new contact record. The trigger function may initiate an automatic query of the data tracking service's database system. If any relevant data objects are identified, they may be automatically imported and stored in the new record that was created by the user. Furthermore, this may be performed in real-time as the user is entering the information. In various implementations, if the user is filling out a form, fields of the form may be automatically completed in real-time.

In a specific implementation, a social network incorporates a "newsfeed" for each user, in which a first user can post or publish text describing his or her status, files, or may address or call attention to a second user on the social network, e.g., through the use of "at mentions" ("@mentions"). In addition, if the first user and the second user are "connected" and/or are "following" each other, then the first user can post to the second user's newsfeed, also known as "posting to the second user's wall." A third user who is following both the first and second user will be able to view ongoing online "conversations" between the first and second user, and may even have those conversations echoed on his or her respective newsfeed.

If those conversations include files or other objects, then the third user may be able to access and view those posted objects as well. Chatter® is an example of a social network, and is offered by salesforce.com, inc. While Chatter is referenced in this disclosure, a person having ordinary skill in the art will appreciate that other social networks may incorporate the features described herein.

An online social network is a digitized representation of human interaction made public for a wider audience. Whereas the audience for a conventional conversation between two people may be limited to those in close audible proximity between those two people, a conversation that takes place on an online social network is not bound by such physical constraints. Any other person or user who is interested in following an online conversation may do so.

In various implementations, an online social network, such as Chatter® provided by salesforce.com, inc., may provide one or more users with notifications regarding a de-duplication process. As previously discussed, information from several data sources may be compared automatically and in real-time to determine whether or not duplicative information exists in any of the data sources. In various implementations, the on-demand service provider may gather information about the duplicative information, such as the identity of possible matching records and which information matches, and include the information in a feed item that is provided to several users via an information feed of the online social network. In this way, the several users may be provided with visibility of the de-duplication process.

For example, a first user may be a sales representative working in a call center. The sales representative may get a cold call from a potential customer. While taking the call, the sales representative may enter contact information, such as a name and email address, into a form as a lead record. A second user may already know the potential customer and already have contact information stored for that particular customer as a contact record. In this instance, the on-demand service provider may determine that possible duplicate records exist. This might be determined based on matching information, such as a matching name or a matching phone number associated with the potential customer. The on-demand service provider may then provide the first user and the second user with notifications via an online social network. Because the second user has been provided with the notification, he or she now knows that the first user has made contact with his or her customer.

While one or more implementations and techniques are described with reference to an embodiment in which a de-duplication process is implemented in a system having an application server providing a front end for an on-demand database service capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples, the one or more implementations are not limited to the examples depicted in the figures.

FIG. 7 shows an exemplary image 2000 of a graphical user interface presented in a web browser at a client machine, in accordance with one or more embodiments.

DETAILED DESCRIPTION

Figure 1:
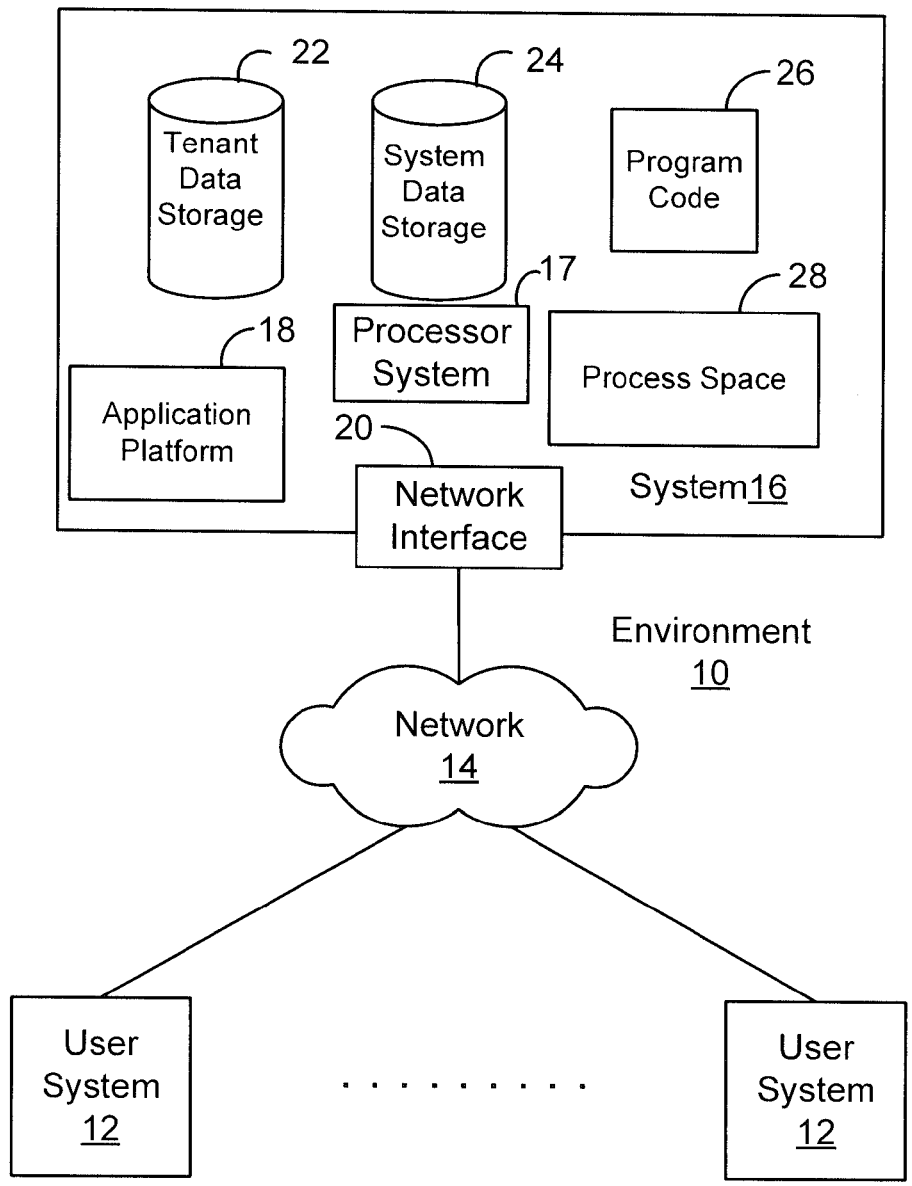
FIG. 1 shows a block diagram of an example of an environment 10 in which an on-demand database service can be used in accordance with some implementations.

Systems and methods are provided for fragmenting a newsfeed by promoting an item in the newsfeed to another newsfeed. Examples of systems, apparatus, and methods according to the disclosed implementations are described in this section. These examples are being provided solely to add context and aid in the understanding of the disclosed implementations. It will thus be apparent to one skilled in the art that implementations may be practiced without some or all of these specific details. In other instances, certain process/method operations, also referred to herein as "blocks," have not been described in detail in order to avoid unnecessarily obscuring implementations. Other applications are possible, such that the following examples should not be taken as definitive or limiting either in scope or setting.

In the following detailed description, references are made to the accompanying drawings, which form a part of the description and in which are shown, by way of illustration, specific implementations. Although these implementations are described in sufficient detail to enable one skilled in the art to practice the disclosed implementations, it is understood that these examples are not limiting, such that other implementations may be used and changes may be made without departing from their spirit and scope. For example, the blocks of methods shown and described herein are not necessarily performed in the order indicated. It should also be understood that the methods may include more or fewer blocks than are indicated. In some implementations, blocks described herein as separate blocks may be combined. Conversely, what may be described herein as a single block may be implemented in multiple blocks.

Various implementations described or referenced herein are directed to different methods, apparatus, systems, and computer program products for fragmenting an information feed showing feed items on a display device in an online social network, also referred to herein as a social networking system or an enterprise social network. The feed items in the information feed may include information updates stored in an on-demand database service environment. In some implementations, the disclosed methods, apparatus, systems, and computer program products may be configured or designed for use in a multi-tenant database environment.

In some implementations, an online social network may allow a user to follow data objects in the form of records such as cases, accounts, or opportunities, in addition to following individual users and groups of users. One example of such an online social network is Chatter®, provided by salesforce.com of San Francisco, Calif. Such online social networks can be implemented in various settings, including enterprises such as business organizations or groups within such an organization. For instance, Chatter® can be used by employee users of a business organization to communicate and collaborate with each other for various purposes.

The "following" of a record stored in a database, as described in greater detail below, allows a user to track the progress of that record. Updates to the record, also referred to herein as changes to the record, can occur and be noted on an information feed such as the record feed or the news feed of a user subscribed to the record. With the disclosed implementations, such record updates are often presented as an item or entry in the feed. Such a feed item can include a single update or a collection of individual updates. Information updates presented as feed items in an information feed can include updates to a record, as well as other types of updates such as user actions and events, as described herein.

Examples of record updates include field changes in the record, as well as the creation of the record itself. Examples of other types of information updates, which may or may not be linked with a particular record depending on the specific use of the information update, include messages as described herein. Examples of such messages include posts such as explicit text or characters submitted by a user, multimedia data sent between or among users (for instance, included in a post), status updates such as updates to a user's status or updates to the status of a record, uploaded files, indications of a user's personal preferences such as "likes" and "dislikes," and links to other data or records.

Information updates can also be group-related, e.g., a change to group status information for a group of which the user is one of possibly additional members. A user following, e.g., subscribed to, a record is capable of viewing record updates on the user's news feed, which can also include the other various types of information updates described above. Any number of users can follow a record and thus view record updates in this fashion. Some records are publicly accessible, such that any user can follow the record, while other records are private, for which appropriate security clearance/permissions are a prerequisite to a user following the record.

Online social networks are increasingly becoming a common way to facilitate communication between individuals and groups of individuals, any of whom can be recognized as "users" of a social networking system. In many social networks, individuals may establish connections with one other, which may be referred to as "friending" one another. By establishing such a connection, one user may be able to see information generated by or associated with another user. For instance, a first user may be able to see information posted by a second user to the first user's personal social network page. One implementation of such a personal social network page is a user's profile page, for example, in the form of a web page representing the user's profile. For example, a post submitted by the second user about the first user can be presented on the first user's profile feed, also referred to herein as the user's "wall," which can be displayed on the first user's profile page.

In some implementations, an information feed in the context of a social network may be a collection of information selected from the social network for presentation in a user interface. The information presented in the information feed may include posts to a user's wall or any other type of information accessible within the social network. A feed item can include various types of data including character-based data, audio data, video data, or combinations of these. For instance, a post can include text in combination with a JPEG image or animated image.

Feed items in information feeds such as a user's news feed may include messages, which can take the form of: posts comprising textual/character-based inputs such as words, phrases, statements, questions, emotional expressions, symbols, leetspeak, or combinations of these; responses to posts, also referred to herein as "comments", such as words, phrases, statements, answers, questions, reactionary emotional expressions, or combinations of these; indications of personal preferences which can be submitted as responses to posts or comments; status updates; and hyperlinks. In other examples, messages can be in the form of file uploads, such as presentations, documents, multimedia files, and the like.

In some implementations, a news feed may be specific to an individual user, a group of users, or a data object (e.g., a file, document, Web page, or a collection of documents, files, or Web pages). For instance, a group of users on a social network may publish a news feed. Members of the group and the larger social network may view and post to the group news feed in accordance with a permissions configuration for the news feed and the group.

In some implementations, when data such as posts or comments input from one or more users are published to an information feed for a particular user, group, object, or other construct within a social network, an e-mail notification or other type of notification (e.g., text message) may be transmitted to all users following the user, group, or object in addition to the posting of the published data as a feed item in one or more feeds, such as a news feed or a record feed. In some social networks, the occurrence of such a notification is limited to the first instance of a published input, which may form part of a larger conversation. For instance, a notification may be transmitted for an initial post, but neither for comments on the post nor for follow-up posts related to the initial post. In some other implementations, notifications are transmitted for all such published inputs.

These and other implementations described and reference herein may be embodied in various types of hardware, software, firmware, of combinations of these. For example, some techniques disclosed herein may be implemented, at least in part, by machine-readable media that include program instructions, state information, etc., for performing various services and operations described herein. Examples of program instructions include both machine code, such as produced by a compiler, and files containing higher-level code that may be executed by a computing device such as a server or other data processing apparatus using an interpreter. Examples of machine-readable media include, but are not limited to, magnetic media such as hard disks, floppy disks, and magnetic tape; optical media such as CD-ROM disks; magneto-optical media; and hardware devices that are specially configured to store program instructions, such as read-only memory devices ("ROM") and random access memory ("RAM") devices. These and other features of the disclosed implementations will be described in more detail below with reference to the associated drawings.

The term "multi-tenant database system" can refer to those systems in which various elements of hardware and software of a database system may be shared by one or more customers. For example, a given application server may simultaneously process requests for a great number of customers, and a given database table may store rows for a potentially much greater number of customers. The term "query plan" generally refers to one or more operations used to access information in a database system.

A "user profile" or "user's profile" is generally configured to store and maintain data about the user of the database system. The data can include general information, such as title, phone number, a photo, a biographical summary, and a status (e.g., text describing what the user is currently doing). As mentioned below, the data can include messages created by other users. Where there are multiple tenants, a user is typically associated with a particular tenant. For example, a user could be a salesperson of a company, which is a tenant of the database system that provides a database service.

The term "record" generally refers to a data entity, such as an instance of a data object created by a user of the database service, for example, about a particular (actual or potential) business relationship or project. The data object can have a data structure defined by the database service (a standard object) or defined by a subscriber (custom object). For example, a record can be for a business partner or potential business partner (e.g., a client, vendor, distributor, etc.) of the user, and can include an entire company, subsidiaries, or contacts at the company. As another example, a record can be a project that the user is working on, such as an opportunity (e.g., a possible sale) with an existing partner, or a project that the user is trying to get. In one implementation of a multi-tenant database, each record for the tenants has a unique identifier stored in a common table. A record has data fields that are defined by the structure of the object (e.g., fields of certain data types and purposes). A record can also have custom fields defined by a user. A field can be another record or include links thereto, thereby providing a parent-child relationship between the records.

The terms "information feed" and "feed" are used interchangeably herein and generally refer to a combination (e.g., a list) of feed items or entries with various types of information and data. Such feed items can be stored and maintained in one or more database tables, e.g., as rows in the table(s), that can be accessed to retrieve relevant information to be presented as part of a displayed feed. The term "feed item" (or feed element) refers to an item of information, which can be presented in the feed such as a post published by a user. Feed items of information about a user can be presented in a user's profile feed of the database, while feed items of information about a record can be presented in a record feed in the database, by way of example. A profile feed and a record feed are examples of different information feeds. A second user following a first user or record can receive the feed items associated with the first user and the record for display in the second user's news feed, which is another type of information feed. In some implementations, the feed items from any number of followed users and records can be combined into a single information feed of a particular user.

As examples, a feed item can be a message, such as a user-generated post of text data, and a feed tracked update to a record or profile, such as a change to a field of the record. A feed can be a combination of messages and feed tracked updates. Messages include text created by a user, and may include other data as well. Examples of messages include posts, user status updates, and comments. Messages can be created for a user's profile or for a record. Posts can be created by various users, potentially any user, although some restrictions can be applied. As an example, posts can be made to a wall section of a user's profile page (which can include a number of recent posts) or a section of a record that includes multiple posts. The posts can be organized in chronological order when displayed in a graphical user interface (GUI), for instance, on the user's profile page, as part of the user's profile feed. In contrast to a post, a user status update changes a status of a user and can be made by that user or an administrator. Other similar sections of a user's profile can also include an "About" section. A record can also have a status, the update of which can be provided by an owner of the record or other users having suitable write access permissions to the record. The owner can be a single user, multiple users, or a group. In one implementation, there is only one status for a record.

In one implementation, a comment can be made on any feed item. En another implementation, comments are organized as a list explicitly tied to a particular feed tracked update, post, or status update. In this implementation, comments may not be listed in the first layer (in a hierarchal sense) of feed items, but listed as a second layer branching from a particular first layer feed item.

A "feed tracked update," also referred to herein as a "feed update," is one type of information update and generally refers to data representing an event. A feed tracked update can include text generated by the database system in response to the event, to be provided as one or more feed items for possible inclusion in one or more feeds. In one implementation, the data can initially be stored, and then the database system can later use the data to create text for describing the event. Both the data and/or the text can be a feed tracked update, as used herein. In various implementations, an event can be an update of a record and/or can be triggered by a specific action by a user. Which actions trigger an event can be configurable. Which events have feed tracked updates created and which feed updates are sent to which users can also be configurable. Messages and feed updates can be stored as a field or child object of the record. For example, the feed can be stored as a child object of the record.

A "group" is generally a collection of users. In some implementations, the group may be defined as users with a same or similar attribute, or by membership. In one implementation, a "group feed" includes any feed item about any user in a group. In another implementation, the group feed includes feed items that are about the group as a whole. In one implementation, the feed items for a group are only posts and comments.

An "entity feed" or "record feed" generally refers to a feed of feed items about a particular record in the database, such as feed tracked updates about changes to the record and posts made by users about the record. An entity feed can be composed of any type of feed item. Such a feed can be displayed on a page such as a web page associated with the record, e.g., a home page of the record. As used herein, a "profile feed" is a feed of feed items about a particular user. In one implementation, the feed items for a profile feed are posts and comments that other users make about or send to the particular user, and status updates made by the particular user. Such a profile feed can be displayed on a page associated with the particular user. In another implementation, feed items in a profile feed could include posts made by the particular user and feed tracked updates initiated based on actions of the particular user.

I. General Overview

Systems, apparatus, and methods are provided for implementing enterprise level social and business information networking. Such implementations can provide more efficient use of a database system. For instance, a user of a database system may not easily know when important information in the database has changed, e.g., about a project or client. Implementations can provide feed tracked updates about such changes and other events, thereby keeping users informed.

By way of example, a user can update a record (e.g., an opportunity such as a possible sale of 1000 computers). Once the record update has been made, a feed tracked update about the record update can then automatically be sent (e.g., in a feed) to anyone subscribing to the opportunity or to the user. Thus, the user does not need to contact a manager regarding the change in the opportunity, since the feed tracked update about the update is sent via a feed right to the manager's feed page (or other page).

Next, mechanisms and methods for providing systems implementing enterprise level social and business information networking will be described with reference to example implementations. First, an overview of an example database system is described, and then examples of tracking events for a record, actions of a user, and messages about a user or record are described. Various implementations about the data structure of feeds, customizing feeds, user selection of records and users to follow, generating feeds, and displaying feeds are also described.

II. System Overview

FIG. 1 shows a block diagram of an example of an environment 10 in which an on-demand database service can be used in accordance with some implementations. Environment 10 may include user systems 12, network 14, database system 16, processor system 17, application platform 18, network interface 20, tenant data storage 22, system data storage 24, program code 26, and process space 28. In other implementations, environment 10 may not have all of these components and/or may have other components instead of, or in addition to, those listed above.

Environment 10 is an environment in which an on-demand database service exists. User system 12 may be any machine or system that is used by a user to access a database system 16. For example, any of user systems 12 can be a handheld computing device, a mobile phone, a laptop computer, a work station, and/or a network of such computing devices. As illustrated in FIG. 1 user systems 12 might interact via a network 14 with an on-demand database service, which is implemented in the example of FIG. 1 as database system 16.

An on-demand database service, such as system 16, is a database system that is made available to outside users, who do not need to necessarily be concerned with building and/or maintaining the database system. Instead, the database system may be available for their use when the users need the database system, i.e., on the demand of the users. Some on-demand database services may store information from one or more tenants into tables of a common database image to form a multi-tenant database system (MTS). A database image may include one or more database objects. A relational database management system (RDBMS) or the equivalent may execute storage and retrieval of information against the database object(s). Application platform 18 may be a framework that allows the applications of system 16 to run, such as the hardware and/or software, e.g., the operating system. In some implementations, application platform 18 enables creation, managing and executing one or more applications developed by the provider of the on-demand database service, users accessing the on-demand database service via user systems 12, or third party application developers accessing the on-demand database service via user systems 12.

The users of user systems 12 may differ in their respective capacities, and the capacity of a particular user system 12 might be entirely determined by permissions (permission levels) for the current user. For example, where a salesperson is using a particular user system 12 to interact with system 16, that user system has the capacities allotted to that salesperson. However, while an administrator is using that user system to interact with system 16, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level, also called authorization.

Network 14 is any network or combination of networks of devices that communicate with one another. For example, network 14 can be any one or any combination of a LAN (local area network), WAN (wide area network), telephone network, wireless network, point-to-point network, star network, token ring network, hub network, or other appropriate configuration. Network 14 can include a TCP/IP (Transfer Control Protocol and Internet Protocol) network, such as the global internetwork of networks often referred to as the "Internet" with a capital "I." The Internet will be used in many of the examples herein. However, it should be understood that the networks that the present implementations might use are not so limited, although TCP/IP is a frequently implemented protocol.

User systems 12 might communicate with system 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP signals to and from an HTTP server at system 16. Such an HTTP server might be implemented as the sole network interface 20 between system 16 and network 14, but other techniques might be used as well or instead. In some implementations, the network interface 20 between system 16 and network 14 includes load sharing functionality, such as round-robin HTTP request distributors to balance loads and distribute incoming HTTP requests evenly over a plurality of servers. At least for users accessing system 16, each of the plurality of servers has access to the MTS' data; however, other alternative configurations may be used instead.

In one implementation, system 16, shown in FIG. 1, implements a web-based customer relationship management (CRM) system. For example, in one implementation, system 16 includes application servers configured to implement and execute CRM software applications as well as provide related data, code, forms, web pages and other information to and from user systems 12 and to store to, and retrieve from, a database system related data, objects, and Webpage content. With a multi-tenant system, data for multiple tenants may be stored in the same physical database object in tenant data storage 22, however, tenant data typically is arranged in the storage medium(s) of tenant data storage 22 so that data of one tenant is kept logically separate from that of other tenants so that one tenant does not have access to another tenant's data, unless such data is expressly shared. In certain implementations, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages creation, storage of the applications into one or more database objects and executing of the applications in a virtual machine in the process space of the system 16.

One arrangement for elements of system 16 is shown in FIG. 1, including a network interface 20, application platform 18, tenant data storage 22 for tenant data 23, system data storage 24 for system data 25 accessible to system 16 and possibly multiple tenants, program code 26 for implementing various functions of system 16, and a process space 28 for executing MTS system processes and tenant-specific processes, such as running applications as part of an application hosting service. Additional processes that may execute on system 16 include database indexing processes.

Several elements in the system shown in FIG. 1 include conventional, well-known elements that are explained only briefly here. For example, each user system 12 could include a desktop personal computer, workstation, laptop, PDA, cell phone, or any wireless access protocol (WAP) enabled device or any other computing device capable of interfacing directly or indirectly to the Internet or other network connection. User system 12 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 12 to access, process and view information, pages and applications available to it from system 16 over network 14. Each user system 12 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) of the computing device in conjunction with pages, forms, applications and other information provided by system 16 or other systems or servers. For example, the user interface device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

According to one implementation, each user system 12 and all of its components are operator configurable using applications, such as a browser, including computer code run using a central processing unit such as an Intel Pentium® processor or the like. Similarly, system 16 (and additional instances of an MTS, where more than one is present) and all of its components might be operator configurable using application(s) including computer code to run using processor system 17, which may be implemented to include a central processing unit, which may include an Intel Pentium® processor or the like, and/or multiple processor units. A computer program product implementation includes a non-transitory machine-readable storage medium (media) having instructions stored thereon/in, which can be used to program a computer to perform any of the processes/methods of the implementations described herein. Computer program code 26 for operating and configuring system 16 to intercommunicate and to process web pages, applications and other data and media content as described herein is preferably downloadable and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for the disclosed implementations can be realized in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to refer to a computing device or system, including processing hardware and process space(s), an associated storage system such as a memory device or database, and, in some instances, a database application (e.g., OODBMS or RDBMS) as is well known in the art. It should also be understood that "server system" and "server" are often used interchangeably herein. Similarly, the database objects described herein can be implemented as single databases, a distributed database, a collection of distributed databases, a database with redundant online or offline back-ups or other redundancies, etc., and might include a distributed database or storage network and associated processing intelligence.

XIII. De-Duplication and Social Network Visualization

Figure 2:
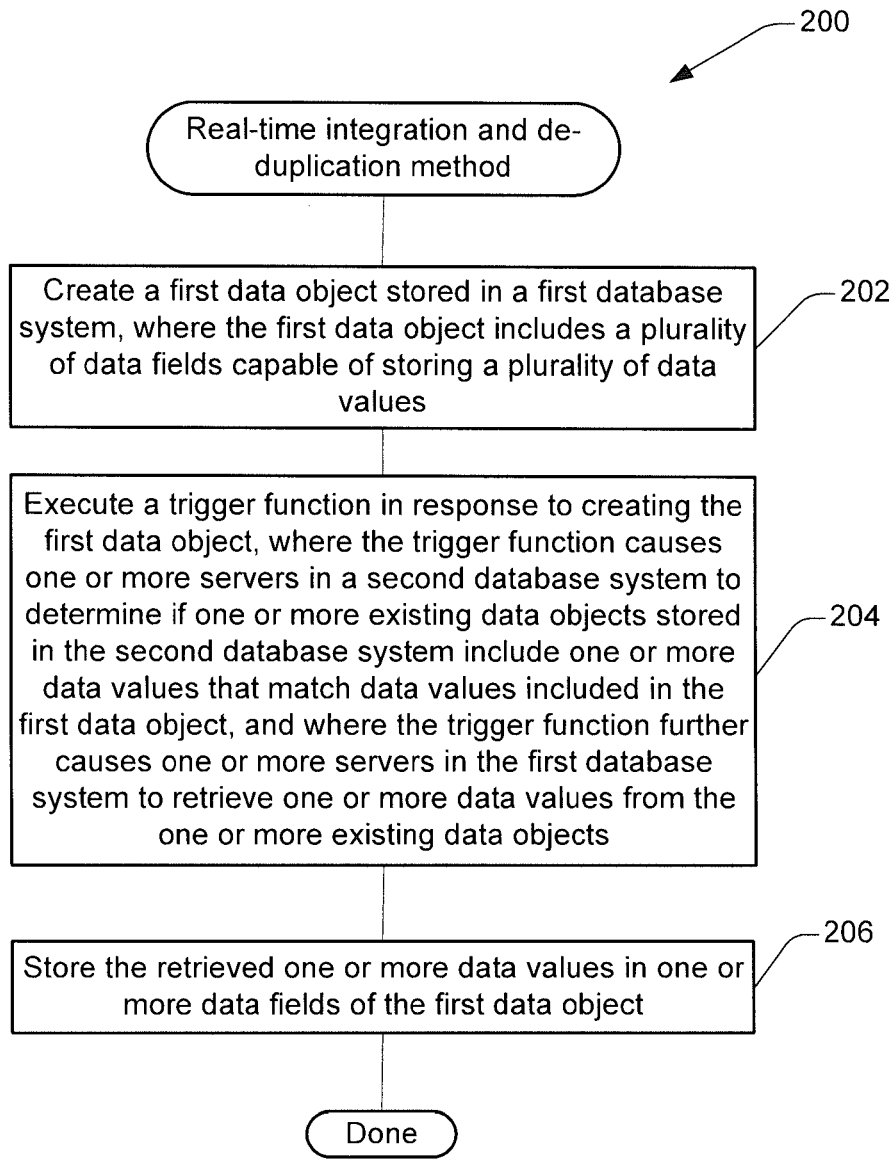
FIG. 2 shows a flowchart of an example of a method 1500 for integrating and de-duplicating data objects, performed in accordance with some implementations.

FIG. 2 illustrates an example of a method 200 for integrating and de-duplicating data objects, performed in accordance with some implementations. In various implementations, method 200 may provide real-time de-duplication of information based on information received from a user. In some implementations, a user may enter information that is subsequently stored in a data object in a first database system. In various implementations, the information may be automatically compared with information stored in other data objects in other database systems. For example, contact information entered by the user may be compared with contact information in other database systems, such as a cloud-based data tracking database. Moreover, relevant information may be retrieved, stored, and presented to the user in real-time to supplement the information as it is being entered by the user. Thus, according to various implementations, at step 202, a first data object may be created by a user and stored in a first database system.

At step 204, a trigger function may be executed in response to creating the first data object. In various implementations, the trigger function may cause one or more servers in a second database system to determine if one or more existing data objects stored in the second database system include one or more data values that match data values included in the first data object. In various implementations, the second database system may make this determination automatically and in real-time. In some implementations, the trigger function may also cause one or more servers in the first database system to retrieve one or more data values from the one or more existing data objects. Accordingly, additional information may be retrieved from various data sources, such as other database systems, in response to a user creating a data object. Furthermore, in addition to retrieving information, duplicative information may be deleted. Therefore, if matching information stored in the second database system is determined to be included in a duplicate record, one or more servers in the second database system may delete the duplicate record.

At step 206, the retrieved one or more data values may be stored in one or more data fields of the first data object. Thus, according to various implementations, process 200 may retrieve various information, including information the user might not be aware of, and automatically store the information in one or more data fields of the first data object. Returning to the previous example, if the user is entering contact information into a form, additional contact information may be identified, retrieved, and stored in the form automatically and in real-time. Moreover, the retrieved information may be automatically displayed to the user in real-time. Thus, if the user is entering information into the form, retrieved information may be displayed to the user to automatically fill various display fields of the form as the user is entering the information.

Figure 3:
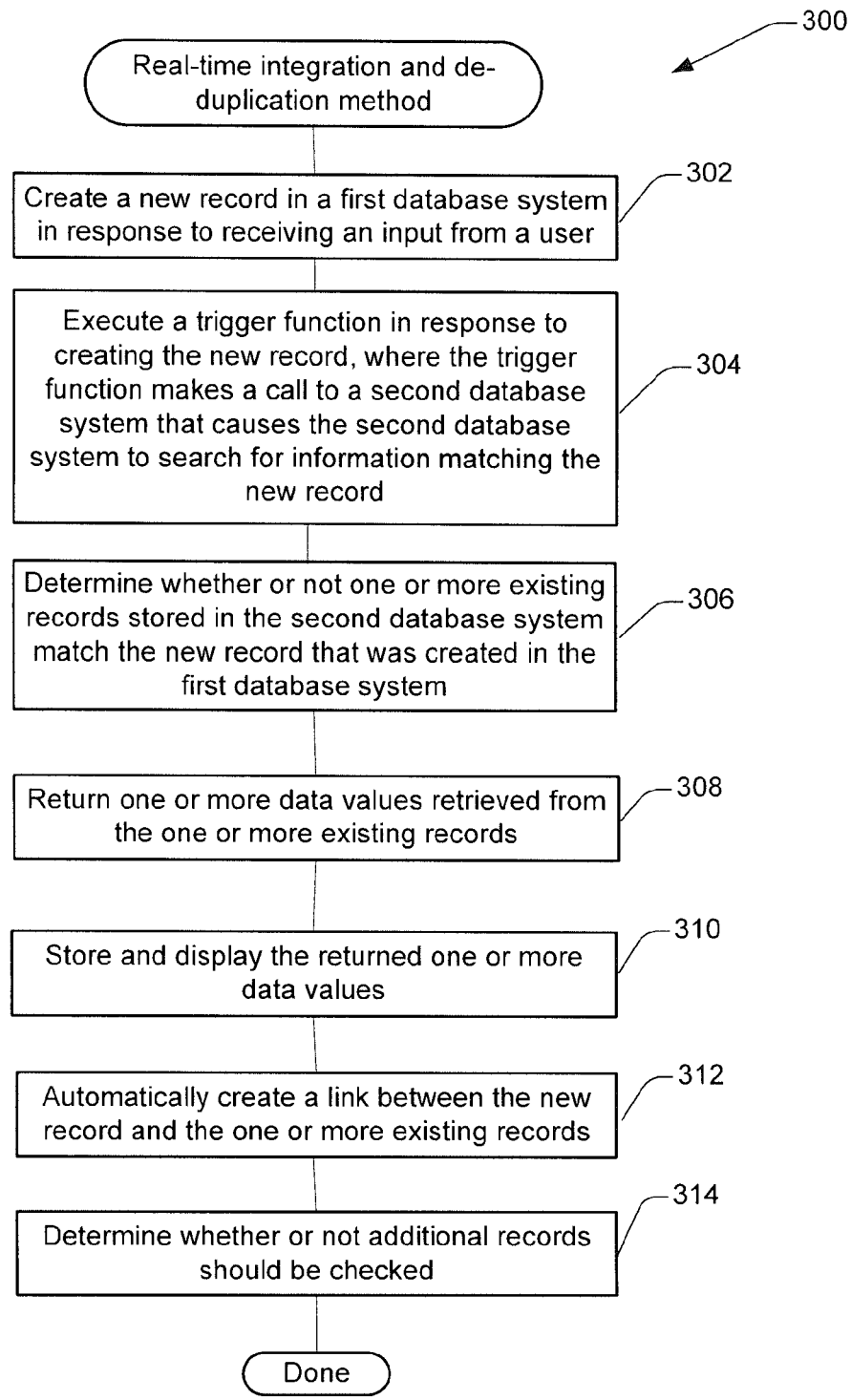
FIG. 3 shows a flowchart of an example of a method 1600 for integrating and de-duplicating records, performed in accordance with some implementations.

FIG. 3 shows a flowchart of an example of a method 300 for integrating and de-duplicating records, performed in accordance with some implementations. In various implementations, method 300 may determine whether or not a new record matches an existing record in one or more database systems. In some implementations, the determining may be performed automatically. As similarly discussed with reference to method 200, method 300 may automatically display information retrieved from the matching records. Thus, according to some implementations, a user may be filling out a form in a web-based application, such as a web browser, when creating a record. In various implementations, the retrieved information may be displayed in display fields of the form in real-time and before the user has finished filling out the form.

At step 302, a user may create a record. In some implementations, a record may be a data object that is stored in a multi-tenant database system configured to provide an on-demand service that the user subscribes to. As previously discussed, a record may generally refer to a data object. In some implementations, the record may be a type of data object that is configured to store a type of information and provide a type of functionality. For example, a record may be a contact record. In various implementations, a contact record may be configured to store contact information associated with a business entity.

In one example, the user may create a contact record after a particular business interaction, such as meeting a salesperson at a networking event. In this instance, the user may provide contact information, such as a name, email address, phone number, and employer, which is then stored in one or more data fields of the contact record.

In various implementations, as part of the on-demand service, the user may be presented with a user interface to manage various data objects associated with the user's account. For example, if the user has contact information stored for various business contacts, the contact information may be stored in a plurality of records, in which one or more records may be dedicated to each contact that the user has stored contact information for. The user may be able to access and/or modify the information via various display fields presented in a user interface.

Figure 6:
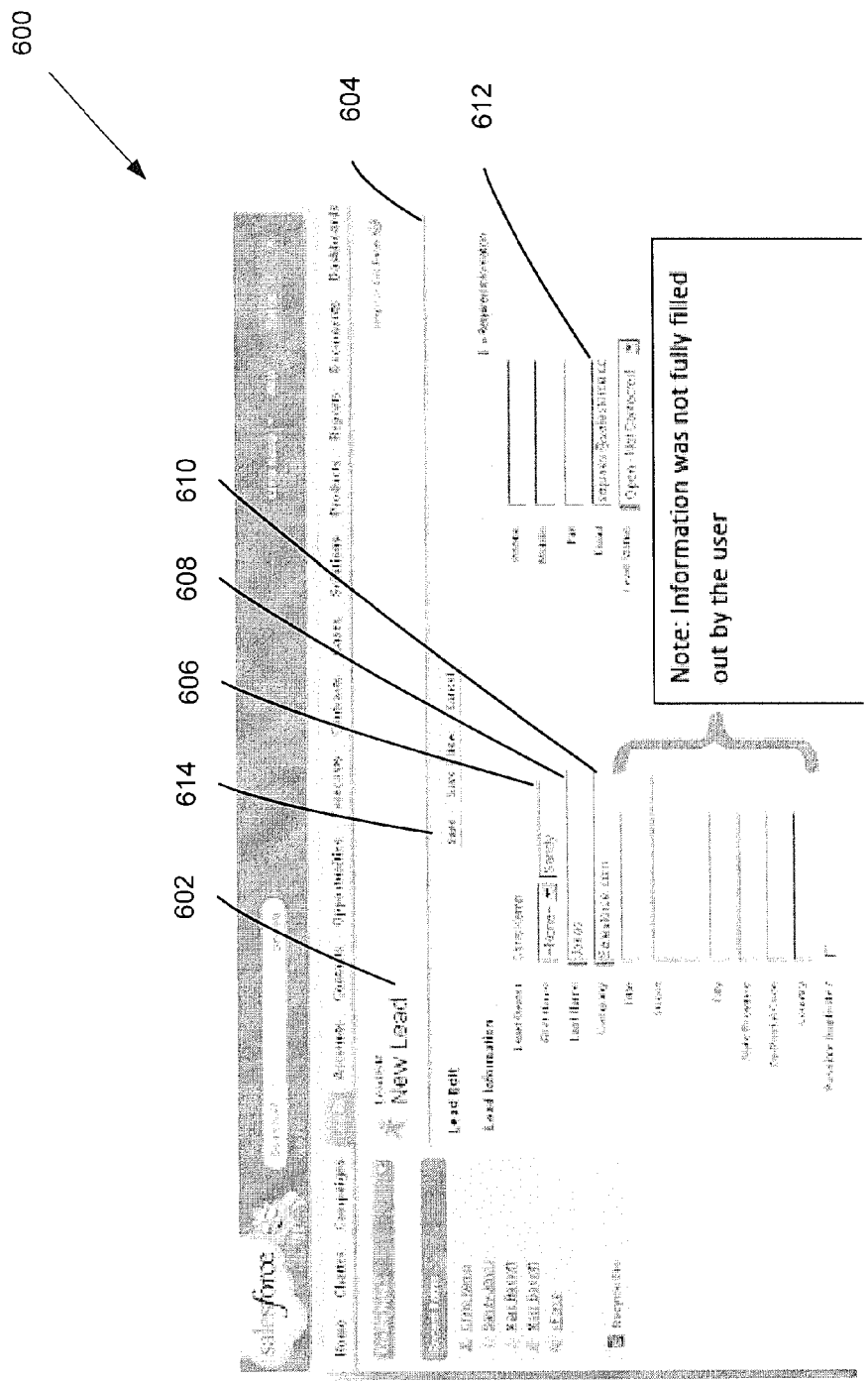
FIG. 6 shows an exemplary image 600 of a graphical user interface presented in a web browser at a client machine, in accordance with one or more embodiments.

FIG. 6 shows an exemplary image 600 of a graphical user interface presented in a web browser at a client machine, in accordance with one or more embodiments. In various implementations, image 600 may include data field 602, data field 604, data field 606, data field 608, data field 610, data field 612, and data field 614. In some implementations, data field 602 is configured to display information about a record which may be retrieved from the record itself, or metadata associated with the record. For example, data field 602 may display a data value that identifies the type of record associated with image 600. In this instance, data field 602 indicates that the record is a "New Lead." Thus, in this example, a user has created a new record that will be used to store information associated with a new lead.

In various implementations, data field 604 displays various data values that may be stored within the record. In various implementations, data field 604 includes data field 606, data field 608, data field 610, data field 612, and data field 614. In some implementations, after creating the record for the new lead, the user may enter the lead's first name in data field 606, the lead's last name in data field 608, the lead's company in data field 610, and the lead's email address in data field 612.

Data field 614 may be configured to receive an input that saves any information entered in the data fields to one or more records, such as the newly created record, in the multi-tenant database system. Thus, in some implementations, after the user is done entering information, the user may provide an input, such as a mouse click on the "save" button, and the entered information may be stored. As shown by image 600, many data fields may be left blank because the user does not know the appropriate information require to fill all data fields.

In some implementations the record may be created by the on-demand service provider instead of the user. In various implementations, one or more automated processes executing on one or more servers operated by the one-demand service provider may be monitoring activities of other entities, such as customers, or may be provided with notifications of events, such as the completion of web-based forms by customers. For example, a customer may enter information into a web-based form, such as a script-based form presented in a hypertext markup language (HTML) webpage. In this example, the customer may be providing the owner of the website with his or her contact information so that he or she may be notified for future sales promotions. In some implementations, the webhoster of the webpage may send a message to the on-demand service provider indicating that the form has been completed. Furthermore, the message may include the information that was entered by the customer. In some implementations, the webpage may be utilizing an on-demand application such as Web-to-Lead® provided by salesforce.com, inc. The on-demand service provider may receive the information and create a new record for a new lead in its multi-tenant database system based on the information that was entered by the customer and based on any contextual information that may be retrieved from the webhost that served the webpage.

Figure 7:
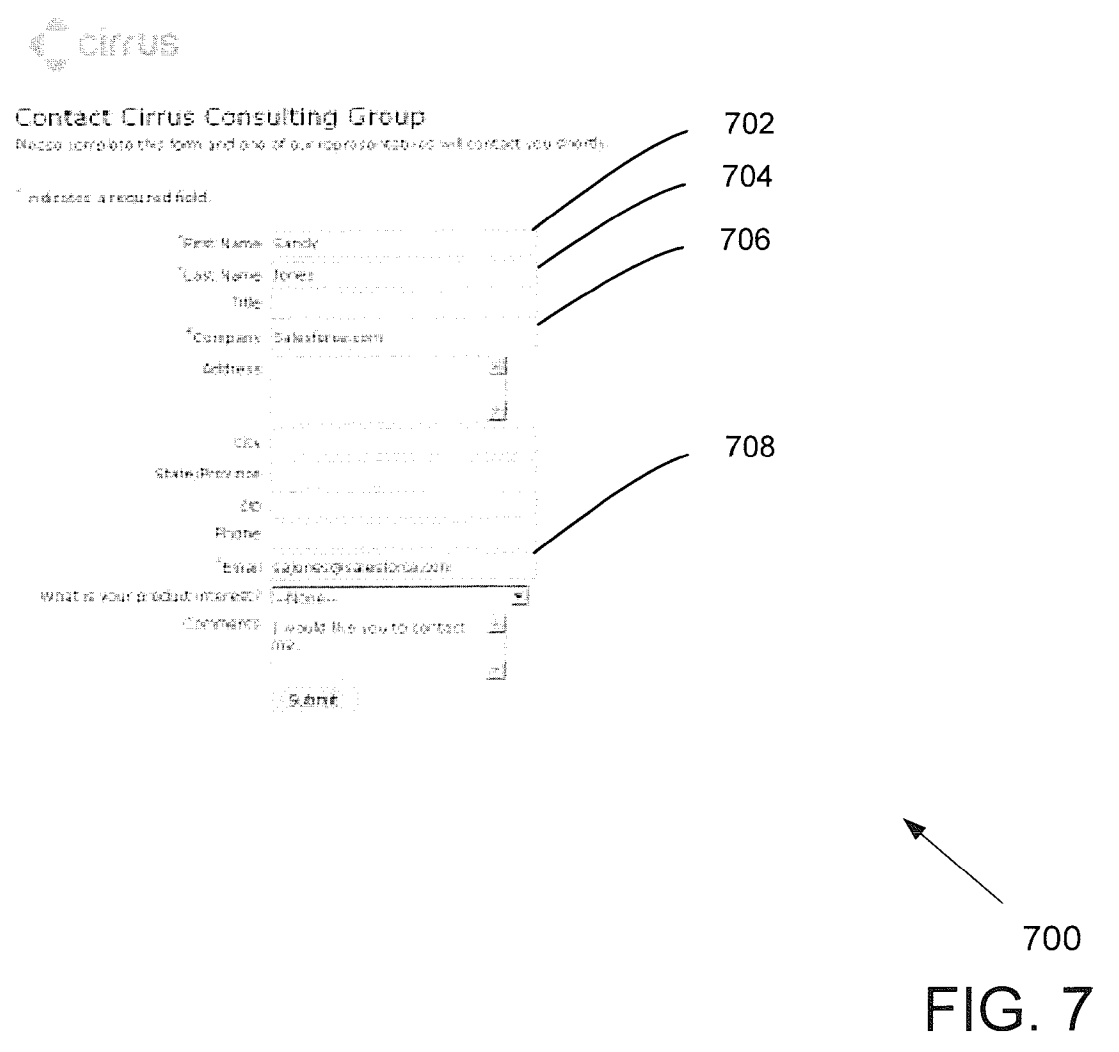

FIG. 7 shows an exemplary image 700 of a graphical user interface presented in a web browser at a client machine, in accordance with one or more embodiments. In various implementations, image 700 may be part of a company's webpage that is displayed to potential customers to allow the potential customers to provide the company with information, such as the potential customer's contact information. In various implementations, image 700 may include data field 702, data field 704, data field 706, and data field 708.

In some implementations, a potential customer accessing a company's website may enter a first name into data field 702, a last name into data field 704, a company name into data field 706, and an email address into data field 708. In this example, one or more servers operated by the webhost may be configured to include the information entered by the potential customer into a message that is sent to the on-demand service provider. In response to receiving the message, the on-demand service provider may create a record for a new lead as similarly displayed by image 600.

Returning to FIG. 3, at step 304, a trigger function may be executed in response to creating the new record, where the trigger function makes a call to a second database system that causes the second database system to search for information related to the new record. In some implementations, a trigger function may be a function that is executed in response a triggering event. In various implementations, an event listener may be part of an automated process executing on one or more servers operated by the on-demand service provider. The event listener may listen for a particular event, such as the creation of a new record. Upon detecting an event, the event listener may invoke the trigger function. In this way, the trigger function may be executed by the one or more servers operated by the on-demand service provider in response to detecting the event, such as a user or an automated process creating a new record. In various implementations, the trigger function may call one or more functions that may be executed by one or more servers in a second database system that, when executed, query the second database system for information.

Furthermore, according to some implementations, the trigger function may be executed in response to an event other than the creation of a record. For example, entering one or more data values in a data field of a record or form may cause the execution of the trigger function. Thus, according to various implementations, as a user is entering information into a form, such as that shown in image 700 in FIG. 7, the trigger function may be executed and a function call may be made to one or more databases. In this way, execution of the trigger function may occur in real-time and prior to the user completing the form.

At step 306 in FIG. 3, one or more servers in the second database system may determine whether or not one or more existing records stored in the second database system match the new record that was created in the first database system.

In various implementations, the second database system may be part of a repository of information containing additional information that may be used to supplement or augment the information that was originally provided by the user. For example, the second database system may be a public database or a database used in an enterprise application that provides a data tracking service. In one instance, the database may be a part of a cloud based data tracking service, such as Data.com® provided by salesforce.com, inc., or information provided by Dun & Bradstreet®. Thus, the second database system may include information, such as contact information, that may be aggregated and crowd sourced from many different users and sources.

In various implementations, when the trigger function is executed, the on-demand service provider may send a message to one or more servers in the second database system. In some implementations, the message may include the information that was entered by the user. The one or more servers in the second database system may use this information as the basis of a search for related documents. For example, information entered by the user may be a first name, last name, and email address. In some implementations, the message may include one or more data values that include the text words that were entered by the user. In some implementations, the message may also include identifiers generated based on a data field that information was entered into. For example, a form may have an identifier associated with a data field that is configured to receive a first name. If a data value is entered into that field, the identifier may be associated with the data value and identify it as a first name.

In various implementations, the second database system may use the information to formulate a search strategy and a query to identify and retrieve relevant data objects. In some implementations, relevant data objects are identified based on matching data values. For example, if a first name provided by the user matches a first name stored in a record in the second database system, that record may be identified as relevant, and retrieved. Thus, a field-by-field comparison may be made based on information entered into the new record and information stored in records in the second database system. If one or more data values, such as a phone number, mailing address, standard industrial classification (SIC) number, or annual revenue, matches, then the record that stores the matching data values may be returned as a result of the query.

It will be appreciated that various different types of searches may be performed. In some implementations, data values from different types of records, such as leads and contacts, may be compared. Furthermore, data values provided by the user may be compared with account names and metadata associated with records in addition to the contents of the records themselves.

At step 308, one or more data values retrieved from the one or more existing records may be returned to the first database system. Thus, according to some implementations, once relevant data objects have been identified and retrieved, the contents of the data objects may be parsed and included in a message that is sent back to one or more servers operated by the on-demand service provider. Thus, any additional information retrieved from one or more additional database systems may be returned to the on-demand service provider for the new record. As similarly discussed with reference to the trigger function, in some implementations, retrieval of the additional information may occur in real-time and before the user has completed entering information into the form.

At step 310, the returned one or more data values may be stored in one or more storage volumes of the first database system. In some implementations, the returned one or more data values may be stored automatically in one or more data fields of the new record. For example, a user may create a new record to store information for a contact. The record may have a predetermined structure which includes several data fields, each of which is associated with a specific type of information. For example a data field may be configured to store one or more data values that identify a contact's first name. In this example, the returned one or more data values may be mapped to data fields of the new record and automatically stored in the new record. In various implementations, the storing may occur in real-time and before the user has finished entering information into the record. Thus, the contents of the new record may be automatically populated with information from several different data sources in real-time.

In some implementations, the returned one or more data values may be displayed to a user via a display device. Thus, according to various implementations, the returned one or more data values may be displayed in display fields of a graphical representation of the new record. For example, if a user is filling out a form used to store information about a contact, the form may have several different fields in which a user may enter information, such as a first name, last name, and email address. In various implementations, additional information retrieved from a data source, such as Data.com® provided by salesforce.com, inc., may be mapped to data fields of the form and displayed in the appropriate display fields in the graphical representation of the form. In various implementations, the additional information may be displayed in real-time and before the user has completed the form or closed a window in a user interface that is used to display the form.

Figure 8:
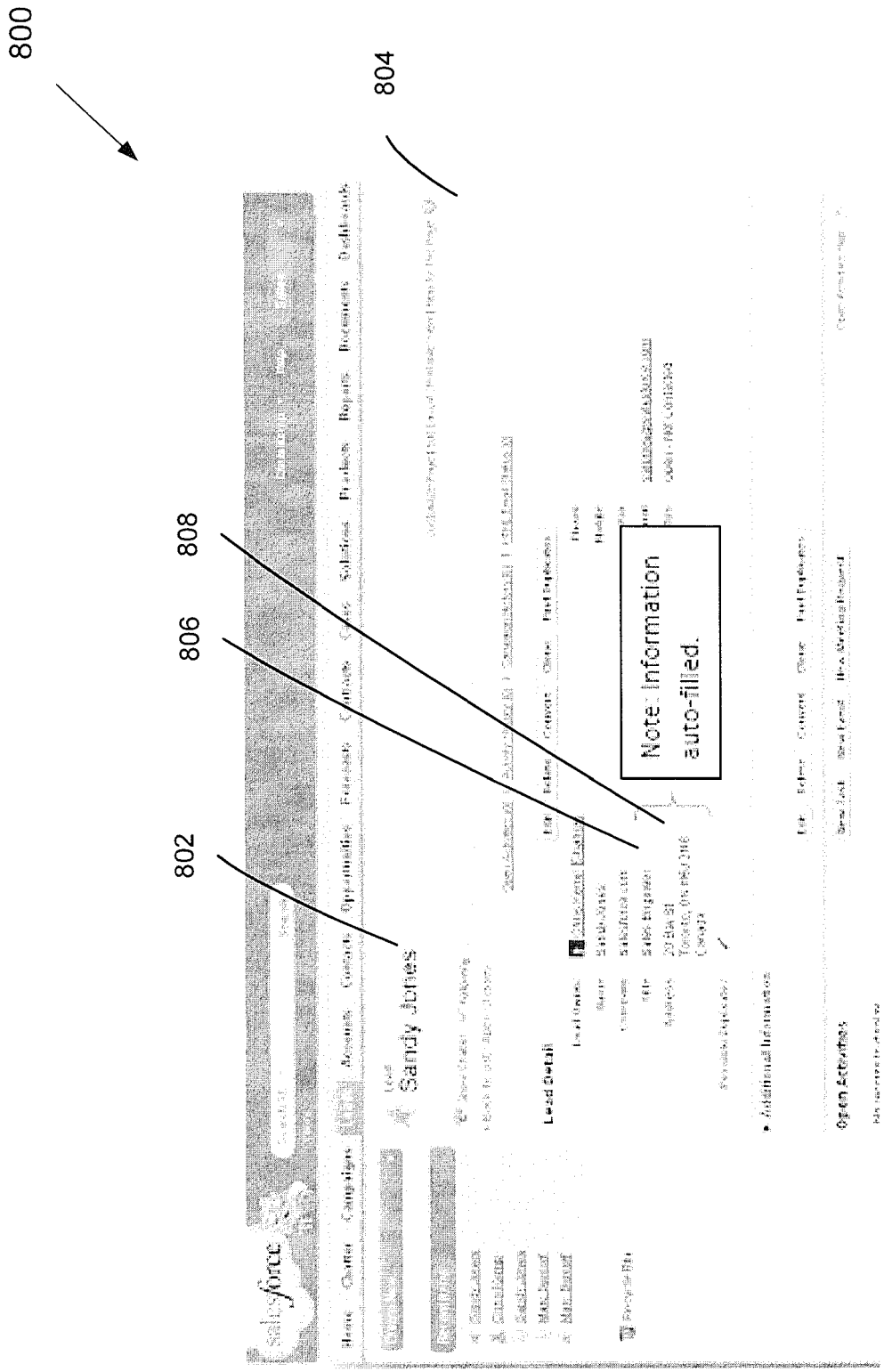
FIG. 8 shows an exemplary image 800 of a graphical user interface presented in a web browser at a client machine, in accordance with one or more embodiments.

FIG. 8 shows an exemplary image 800 of a graphical user interface presented in a web browser at a client machine, in accordance with one or more embodiments. In various implementations, image 800 may include data field 802, data field 804, data field 806, and data field 808.

Data field 802 may be configured to display information about a record which may be retrieved from the record itself, or metadata associated with the record. In this instance, in addition to identifying the type of record, data field 802 additionally displays the name "Sandy Jones" to whom the record belongs. In this instance, the name may have been retrieved from either the information provided by the user or from information retrieved from the second database system.

Data field 804 displays various data values that may be stored within the new record. In various implementations, data field 804 includes data field 806 and data field 808. In some implementations, data field 806 may display a title associated with the new lead. In this instance, the title was not provided by the user and was not known to the user. Instead, the title may have been retrieved from a second database system, such as a database system used by an data tracking service such as Data.com® provided by salesforce.com, inc., in accordance with the process described above. In this way, the user may automatically be presented with and may store information retrieved from various data sources external to the user's own contact information.

According to various implementations, data field 808 may display an address associated with the new lead. As similarly discussed with reference to data field 806, the address was not provided by the user and was not known to the user. Instead, the address was retrieved from the second database system. As previously discussed, the information displayed in data field 806 and data field 808 may be retrieved and stored automatically and in real-time.

Referring back to FIG. 3, at step 312 a link may be created that links the new record to the matching one or more existing records. In some implementations, a link may be an identified association between several records. The functionality of the link may be determined by a record that stores one or more identifiers identifying the records that are linked, and further identifying several settings associated with the link. For example, the settings may determine whether or not one or more actions should be taken in response to any of the linked records being modified, as discussed in greater detail below.

In various implementations, one or more automated processes executed by the on-demand service provider may periodically check linked records to determine whether or not any subsequent changes have been made that may have resulted in any inconsistencies in data values stored among the linked records. In various implementations, one or more servers operated by the on-demand service provider may execute one or more functions in response to determining that an inconsistency exists. In some implementations, the on-demand service provider may automatically update a first record based on information stored in the record that the first record is linked to. For example, a new contact record may be linked to a public record stored in a public database system. If the public record receives a new phone number for the contact, the on-demand service provider may automatically update the information stored in the new contact record to reflect the most current and updated information that is available (i.e. the new phone number stored in the public record).

In some implementations, the on-demand service provider may generate a message that provides one or more users with an automatic notification that updated information is available. Returning to the previous example, one or more servers operated by the on-demand service provider may automatically generate and send a message in response to determining that a phone number stored in the public record has been updated. The message may include one or more data values identifying the new contact record, and providing an indication that updated contact information is available. The message may further identify the type of information (i.e. phone number) and provide the conflicting information (i.e. the old and new phone number). Furthermore, the message may include an automatically generated link to the public record. In various implementations, the message may be sent to several users including the user that created the new contact record.

At step 314, the on-demand service provider may determine whether or not additional records should be processed. For example, if the record was a new lead for a user, the on-demand service provider may determine whether or not additional iterations of method 300 should be performed for all leads stored in that user's account, or for any other type of record in the user's account. Thus, all of the information associated with the user's account may be updated in response to the execution of method 300.

In various implementations, the on-demand service provider's determination of whether or not to perform additional iterations of method 300 may be based on one or more data values stored in a flag or identifier. In some implementations, the flag or identifier may be a predetermined value set by the user as an account setting associated with the user's account. The setting may indicate that the user's leads and/or other types of records, such as contacts and accounts, should be automatically and periodically updated in accordance with method 300. If it is determined that additional records should be checked, method 300 may be repeated for each additional record.

Figure 4:
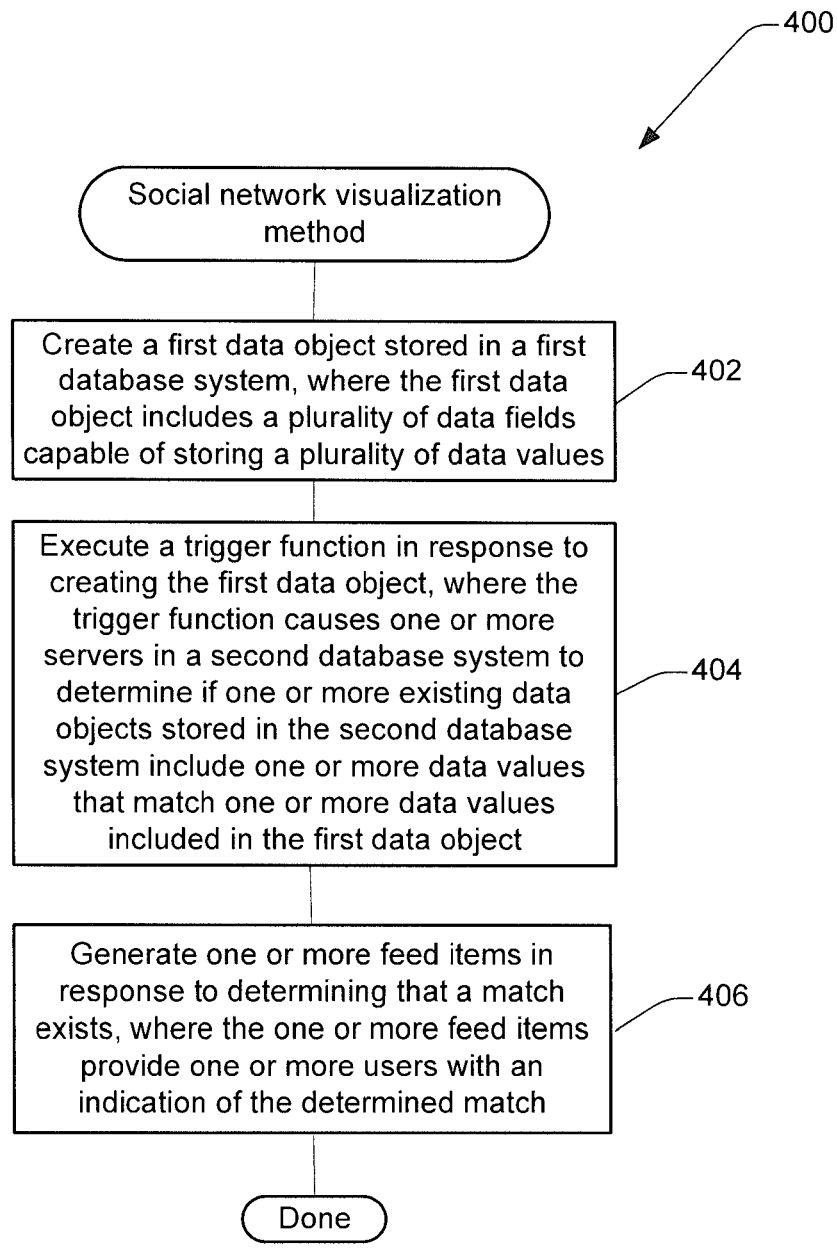
FIG. 4 shows a flowchart of an example of a method 400 for de-duplicating and visualizing data objects via a social network, performed in accordance with some implementations.

FIG. 4 shows a flowchart of an example of a method 400 for de-duplicating and visualizing data objects via a social network, performed in accordance with some implementations. In various implementations, method 400 may provide real-time de-duplication of information based on information provided by a user, and further provide social-network based visibility of the de-duplication process. In some implementations, a user may enter information that is subsequently stored in a data object in a first database system. In various implementations, the information may be automatically compared with information stored in other data objects in other database systems. The result of the comparison, among other information, may be provided to multiple users via a social network, such as Chatter® provided by salesforce.com, inc. Thus, the users may be provided with visibility of the entire de-duplication process automatically and in real-time. Accordingly, at step 402 a first data object may be created and stored in a first database system.

At step 404, a trigger function may be executed in response to creating the first data object. In various implementations, the trigger function may cause one or more servers in a second database system to determine if one or more existing data objects stored in the second database system include one or more data values that match one or more data values included in the first data object. In various implementations, the second database system may make this determination automatically and in real-time. Thus, according to various implementations, additional information may be retrieved from various data sources, such as different database systems, in response to a user creating a data object.

At step 406, one or more feed items may be generated in response to determining that a match exists. In various implementations, the one or more feed items provide one or more users with an indication of the determined match. In some implementations, the feed items provide various information about the matched data objects, such as identifiers that identify the data objects, automatically generated text that describes the match, and a link that allows a user to directly access and/or modify a data object. Furthermore, this information is provided automatically and via an information feed to multiple users and entities that may be associated with the first data object and the one or more existing data objects.

Figure 5:
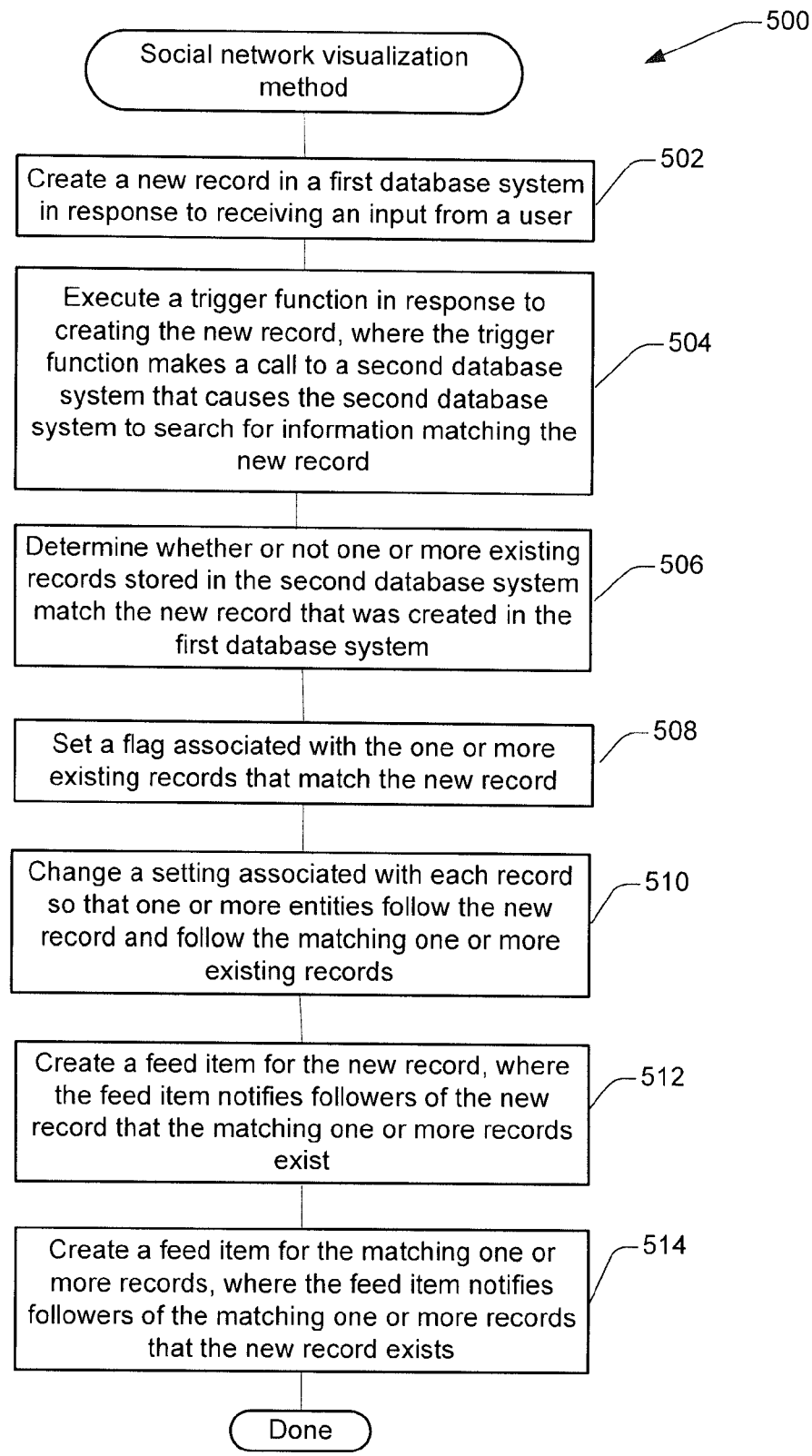
FIG. 5 shows a flowchart of an example of a method 500 for de-duplicating and visualizing records via a social network, performed in accordance with some implementations.

FIG. 5 shows a flowchart of an example of a method 500 for de-duplicating and visualizing records via a social network, performed in accordance with some implementations. In various implementations, method 500 may determine whether or not a new record matches an existing record in one or more database systems. In some implementations, the determining may be performed automatically. Furthermore, method 500 may generate one or more feed items which may be used to notify several users of the potential match.

At step 502, a new record may be created. In some implementations, at step 504, a trigger function may be executed in response to creating the new record. The trigger may make a function call to a second database system that causes the second database system to search for information related to the new record. In various implementations, at step 506, one or more servers in the second database system may determine whether or not one or more existing records stored in the second database system match the new record that was created in the first database system.

At step 508, one or more servers operated by the on-demand service provider may have a requisite access level that allows the on-demand service provider to modify attributes associated with records stored in the second database system. For example, the first database system and the second database system may both be operated by the on-demand service provider, but used to provide different services. In one example, the first database system may be used to provide an on-demand service capable of managing contact information, such as Salesforce® provided by salesforce.com, inc., and the second database system may be used to provide a data tracking service capable of aggregating data from multiple users and entities, such as Data.com® which is also provided by salesforce.com, inc.

In some implementations, the on-demand service provider may modify a data field associated with an existing record that was determined to match the new record. In various implementations, the data field may be a custom checkbox field that stores one or more data values indicating whether the existing record matches the new record. For example, the custom checkbox field may store a flag that indicates either the existing record is a possible duplicate record, or the existing record is not a duplicate record. In various implementations, this flag may be set for each matching existing record stored in the second database system.

In various implementations, one or more other workflows or triggers may be executed in response to setting the flag. For example, one or more automated processes running in the second database system may periodically check custom checkbox fields of records stored in the second database system. In response to determining that a flag has been set for a particular record, the one or more automated processes may execute a function that performs an action, such as automatically deleting the duplicate record or generating an email message that notifies a user or other entity of the existence of a possible duplicate record. In some implementations, the action may be to generate a message that notifies the first database system that the flag has been set. In this instance, an automated process in the first database system may then execute a function. For example, one or more servers in the first database system may instruct one or more servers in the second database system to take a specified action, such as delete the matching existing record.

At step 510, settings associated with each of the records may be modified so that one or more users follow the records. In various implementations, one or more servers operated by on-demand service provider may configure accounts of users to follow one or more records. Automatically configuring the accounts in this way automatically provides one or more users with visibility of changes and modifications made to one or more records. In some implementations, the on-demand service provider may configure the accounts by configuring filters associated with each account's newsfeed to automatically receive feed items for tracked updates for one or more records. Thus, according to some implementations, the on-demand service provider may automatically configure the newsfeeds of various users to follow a record in response to a determination that the record has a duplicate record stored elsewhere, or may be a duplicate record itself.

For example, one or more servers operated by an on-demand service provider may automatically configure accounts belonging to owners of a newly created record to follow the record. In this example, a user who created the new record may automatically be identified as the owner of the record. In various implementations, in response to determining that one or more existing records may match the new record, one or more servers operated by the on-demand service provider may configure the user's account to automatically follow the new record. Similarly, accounts associated with owners of the one or more existing records may be configured so that those owners follow the one or more existing records. Thus, accounts associated with owners of records that may be duplicates, or have duplicates stored elsewhere, may be automatically configured to follow the records that they own.

Furthermore, additional entities, such as other users or any other relevant entity, may have accounts which are also automatically configured. In some implementations, an owner of the new record may be part of a group of users of an on-demand service. In this instance, the accounts associated with each user of the entire group of users may be configured to follow the new record. For example, the user may be part of a sales team using Salesforce®. In this instance, one or more settings in the owner's account may indicate that he or she is part of a sales team and may point to a record storing identifiers that identify other members of the sales team. In some implementations, one or more servers operated by the on-demand service provider may retrieve the record, identify the other users, and configure their accounts to follow the new record. Similarly, this process may be performed for any of the identified records, including the matching one or more existing records and their respective owners.

At step 512, the followers of the new record may be notified that one or more matching records exist. In some implementations, one or more servers operated by the on-demand service provider may provide the notification by generating a feed item that is displayed in each of the followers' respective newsfeeds. For example, the feed item may be a message posted to the new record using an on-demand service, such as Chatter® provided by salesforce.com, inc. In various implementations, the feed item includes one or more data values that may identify one or more of the matching records. The feed item may further include information that was used as the basis for determining that a match exists. For example, if the new record includes a first name that matches a first name stored in an existing record of another database, the matching first name may form the basis for determining that these two records match. In this example, the matching first name may be included in the feed item and displayed in one or more newsfeeds. Furthermore, additional text strings may be automatically generated to provide contextual information for the matching information. For example, a text string stating "This name matches a name stored in an existing record" may be generated and displayed along with the matching name in each of the newsfeeds.

In various implementations, the feed item may include other types of information and other data objects related to either the new record or the matching existing record. For example, in addition to providing information about which data fields match, the feed item may include a link to the matching existing record. Thus, when presented with the feed item in a newsfeed, a follower of the new record may select the link and access the matching record. Accordingly, the automatic notification and information provided by the feed item may allow a user to manually verify whether or not the records actually match and whether or not one of the records is duplicative. Moreover, in some implementations, when accessing the matching record, the user may determine which record should be kept and which record should be deleted and/or modified.

Figure 9:
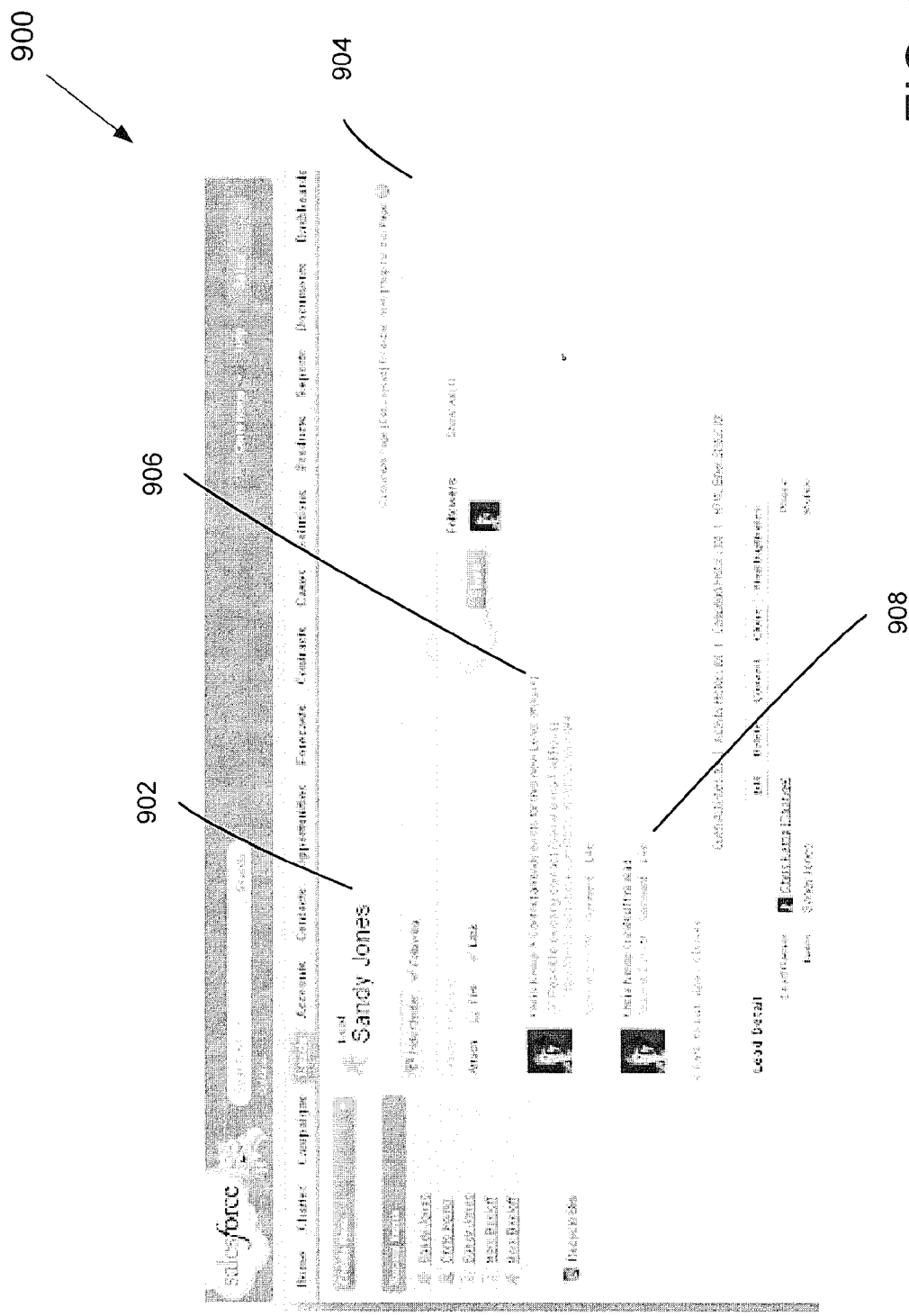
FIG. 9 shows an exemplary image 900 of a graphical user interface presented in a web browser at a client machine, in accordance with one or more embodiments.

FIG. 9 shows an exemplary image 900 of a graphical user interface presented in a web browser at a client machine, in accordance with one or more embodiments. In this example, image 900 displays an information feed for a newly created record. In some implementations, a user may view the feed items depicted in image 900 by accessing the new record itself instead of viewing the feed items via the user's newsfeed. In various implementations, image 900 may include data field 902, data field 904, data field 906, and data field 908. In some implementations, data field 902 is configured to display information about a record which may be retrieved from the record itself, or metadata associated with the record. For example, data field 902 may display a data value that identifies the type of record and an entity, such as a user or business contact, associated with image 900. In this instance, data field 902 indicates that the record is a lead that stores information associated with "Sandy Jones."

In various implementations, data field 904 displays an information feed for the record. According to some implementations, various feed items generated based on changes and tracked updates associated with the record are displayed in data field 904. In various implementations, data field 904 includes data field 906 and data field 908.

In some implementations, data field 908 may display a feed item that is a message indicating that a new record was created. In this instance, the feed item identifies when the record for "Sandy Jones" was created and who the creator is.

In various implementations, data field 906 may display a feed item that is a message indicating that a matching record may exist for the lead "Sandy Jones." Furthermore, the feed item displayed in data field 906 may display at least some of the information that formed the basis of the determination of a match. In some implementations, data field 906 may also display automatically generated text that provides contextual information for data values or fields that formed the basis of the determination of a match. In this instance, data field 906 displays text indicating that an existing contact record already exists, and an email addresses stored in each of the two records that match. In various implementations, data field 906 may display the type of record that may be a matching record. In this instance, the matching record is a contact record and thus a different type of record than the new record which is a lead record.

Returning to FIG. 5, at step 514, a feed item may be created for the matching one or more records, where the feed item notifies followers of the matching one or more records that the new record exists.

As similarly discussed above with reference to step 512, the followers of the matching one or more records may be notified via each of their respective newsfeeds that a new record has been created that may be a duplicate. Thus, according to some implementations, one or more servers operated by the on-demand service provider may provide the notification by generating a feed item that is displayed in each of the followers' respective newsfeeds. In various implementations, the feed item includes one or more data values that may identify the new record. The feed item may further include information that was used as the basis for determining that a match exists. Furthermore, additional text strings may be automatically generated to provide contextual information for the matching information. In various implementations, the feed item may include other types of information and other data objects related to either the new record or the matching existing record. For example, in addition to providing information about which data fields match, the feed item may include a link to the matching existing record.

Figure 10:
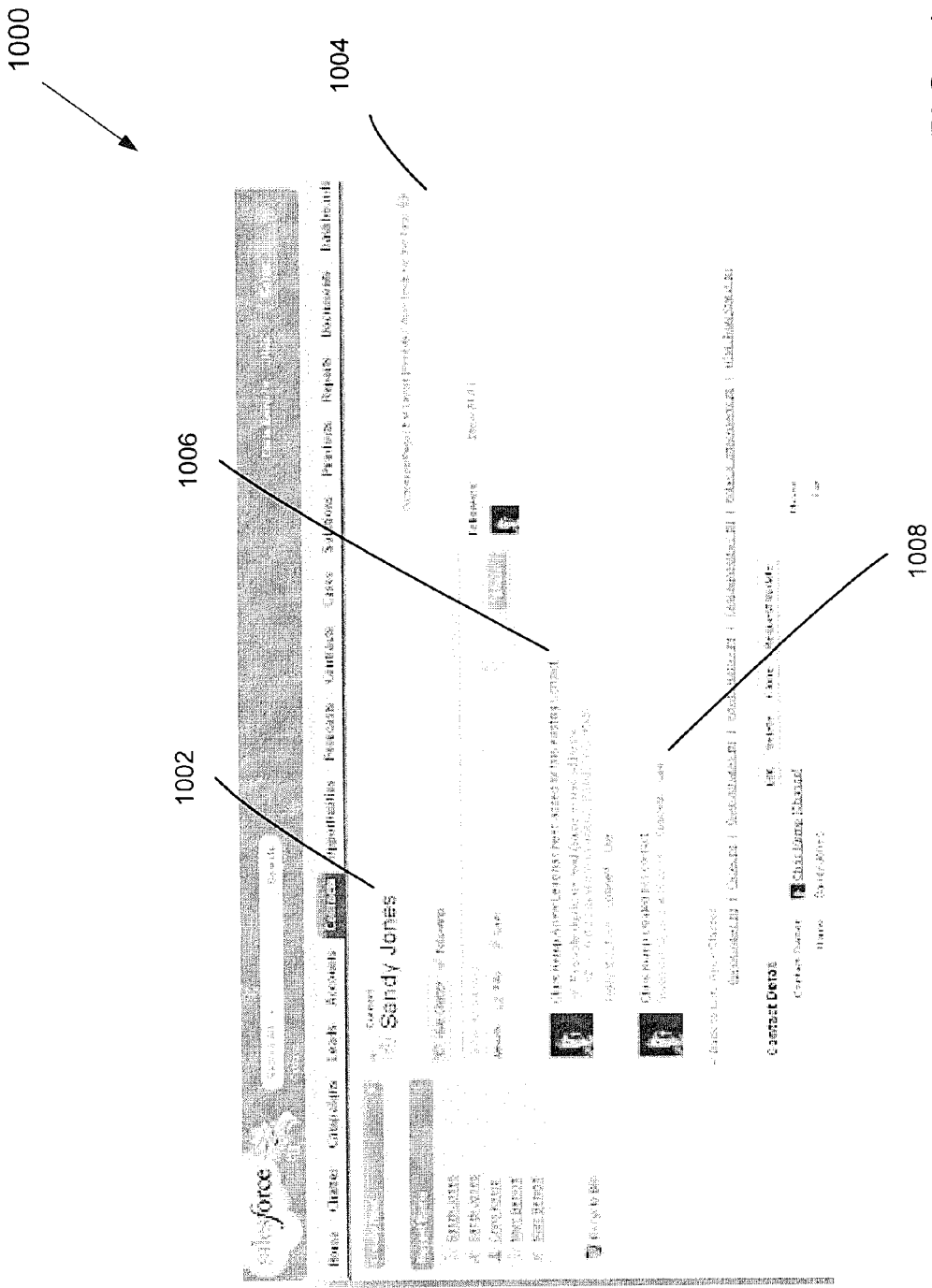
FIG. 10 shows an exemplary image 1000 of a graphical user interface presented in a web browser at a client machine, in accordance with one or more embodiments.

FIG. 10 shows an exemplary image 1000 of a graphical user interface presented in a web browser at a client machine, in accordance with one or more embodiments. As similarly discussed with reference to image 900 in FIG. 9, image 1000 displays an information feed for a record. While image 900 described an information feed that may be generated for a new record, image 1000 displays an information feed that may be generated for the matching record.

In various implementations, image 1000 may include data field 1002, data field 1004, data field, 1006, and data field 1008. As similarly discussed with reference to data field 902 in FIG. 9, data field 1002 is configured to display information about a record which may be retrieved from the record itself, or metadata associated with the record. For example, data field 1002 may display a data value that identifies the type of record associated with image 1000. In this instance, data field 1002 indicates that the record is a contact record for "Sandy Jones."

In various implementations, data field 1004 displays various feed items generated based on changes and tracked updates associated with the contact record for "Sandy Jones." In various implementations, data field 1004 includes data field 1006 and data field 1008.

In some implementations, data field 1008 may display a feed item that is a message including historical data, such as when the contact record for "Sandy Jones" was created and by whom. In various implementations, data field 1006 may display a feed item that is a message indicating that a new record has been created and might be a duplication of the contact record associated with image 1000. In this instance, the feed item identifies when the new record was created and who created it. In various implementations, the feed item may display information that formed the basis of the determination of a match. In some implementations, data field 1006 may also display automatically generated text that provides contextual information for data values or fields that formed the basis of the determination of a match. In this instance, data field 1006 displays text indicating that a new lead has been added, and an email addresses stored in each of the two records matches. Furthermore, data field 1006 may display the type of record that the new record is and provide a link to it. In this instance, the new record is a lead record.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method comprising:
    creating a first data object, wherein the first data object includes a plurality of data fields storing a plurality of data values received by user input, each data value being associated with a data field;
    storing the created first data object in a first database system;
    executing, by the first database system, a trigger function in response to creating the first data object, wherein the trigger function automatically causes one or more servers in a second database system to determine if one or more existing data objects stored in the second database system include one or more data values that match data values included in the first data object stored in the first database system by automatically comparing data values included in the one or more existing data objects stored in the second database system with the data values included in the first data object stored in the first database system, the first database system and the second database system being used to provide different services; and
    generating one or more feed items in response to determining that a match exists, wherein the one or more feed items provide one or more users with an indication of the determined match, the indication comprising at least one of an identifier that identifies the one or more existing data objects having data fields with matching data values and a link activatable by the one or more users for modifying at least one of the first data object and the one or more existing data objects.

2. The method of claim 1, wherein the one or more feed items include a first feed item generated for an owner of the first data object, and wherein the first feed item is capable of notifying the owner that a match has been determined.

3. The method of claim 1, wherein the one or more feed items include a second feed item generated for an owner or owners of the one or more existing data objects, wherein the second feed item is capable of notifying the owner or owners that a match has been determined.

4. The method of claim 1, wherein the one or more feed items include one or more links to either the first data object or the one or more existing data objects, and wherein a user may select the one or more links to access or modify one or more of the first data object and the one or more existing data objects.

5. The method of claim 1 further comprising creating an association between the first data object and the one or more existing data objects, wherein the association automatically applies a change from one data object to another.

6. The method of claim 1, wherein the first data object is a record stored in a multi-tenant data base system and is capable of storing one or more data values contributed by a user of the multi-tenant database system.

7. The method of claim 6, wherein the record is a type of record selected from the group consisting of an account, contact, lead, and opportunity.

8. The method of claim 6, wherein the determining is based on one or more data values selected from the group consisting of a phone number, a name, an address, a company name, a professional organization name, an employee identifier, and an email address.

9. The method of claim 6, wherein the first data object and the one or more existing data objects are different types of records.

10. The method of claim 1, wherein the retrieved one or more data values include information aggregated from a distributed group of users.

11. The method of claim 1, wherein the first database system and the second database system are operated by the same entity.

12. A non-transitory machine-readable medium carrying one or more sequences of instructions which, when executed by one or more processors, cause the one or more processors to carry out the steps of:
    creating a first data object, wherein the first data object includes a plurality of data fields storing a plurality of data values received by user input, each data value being associated with a data field;
    storing the created first data object in a first database system;
    executing, by the first database system, a trigger function in response to creating the first data object, wherein the trigger function automatically causes one or more servers in a second database system to determine if one or more existing data objects stored in the second database system include one or more data values that match data values included in the first data object stored in the first database system by automatically comparing data values included in the one or more existing data objects stored in the second database system with the data values included in the first data object stored in the first database system, the first database system and the second database system being used to provide different services; and
    generating one or more feed items in response to determining that a match exists, wherein the one or more feed items provide one or more users with an indication of the determined match, the indication comprising at least one of an identifier that identifies the one or more existing data objects having data fields with matching data values and a link activatable by the one or more users for modifying at least one of the first data object and the one or more existing data objects.

13. The machine-readable medium of claim 12, wherein the one or more feed items include a first feed item generated for an owner of the first data object, and wherein the first feed item is capable of notifying the owner that a match has been determined.

14. The machine-readable medium of claim 12, wherein the one or more feed items include a second feed item generated for an owner or owners of the one or more existing data objects, wherein the second feed item is capable of notifying the owner or owners that a match has been determined.

15. The machine-readable medium of claim 12, wherein the one or more feed items include one or more links to either the first data object or the one or more existing data objects, and wherein a user may select the one or more links to access or modify one or more of the first data object and the one or more existing data objects.

16. The machine-readable medium of claim 12 further comprising creating an association between the first data object and the one or more existing data objects, wherein the association automatically applies a change from one data object to another.

17. The machine-readable medium of claim 12, wherein the first data object is a record stored in a multi-tenant data base system and is capable of storing one or more data values contributed by a user of the multi-tenant database system.

18. The machine-readable medium of claim 17, wherein the determining is based on one or more data values selected from the group consisting of a phone number, a name, an address, a company name, a professional organization name, an employee identifier, and an email address.

19. An apparatus comprising:
a processor; and
one or more stored sequences of instructions which, when executed by the processor, cause the processor to carry out the steps of:
creating a first data object, wherein the first data object includes a plurality of data fields storing a plurality of data values received by user input, each data value being associated with a data field;
storing the created first data object in a first database system;
executing, by the first database system, a trigger function in response to creating the first data object, wherein the trigger function automatically causes one or more servers in a second database system to determine if one or more existing data objects stored in the second database system include one or more data values that match data values included in the first data object stored in the first database system by automatically comparing data values included in the one or more existing data objects stored in the second database system with the data values included in the first data object stored in the first database system, the first database system and the second database system being used to provide different services; and
generating one or more feed items in response to determining that a match exists, wherein the one or more feed items provide one or more users with an indication of the determined match, the indication comprising at least one of an identifier that identifies the one or more existing data objects having data fields with matching data values and a link activatable by the one or more users for modifying at least one of the first data object and the one or more existing data objects.

20. The apparatus of claim 19, wherein the one or more feed items include a first feed item generated for an owner of the first data object, and wherein the first feed item is capable of notifying the owner that a match has been determined.

21. The apparatus of claim 19, wherein the one or more feed items include a second feed item generated for an owner or owners of the one or more existing data objects, wherein the second feed item is capable of notifying the owner or owners that a match has been determined.

22. The apparatus of claim 19, wherein the one or more feed items include one or more links to either the first data object or the one or more existing data objects, and wherein a user may select the one or more links to access or modify one or more of the first data object and the one or more existing data objects.

\* \* \* \* \*